Dec. 27, 1966 W. A. SCHOOLEY 3,295,075
ELECTROMECHANICAL TRANSDUCER DEVICES EMPLOYING
RADIALLY POLARIZED PIEZOELECTRIC CRYSTALS
Filed Feb. 10, 1964 2 Sheets-Sheet 1

INVENTOR.
Willard A. Schooley,
BY Mueller & Aichele
Attys.

INVENTOR.
Willard A. Schooley,
BY Mueller & Aichele
Attys.

United States Patent Office 3,295,075
Patented Dec. 27, 1966

3,295,075

ELECTROMECHANICAL TRANSDUCER DEVICES EMPLOYING RADIALLY POLARIZED PIEZOELECTRIC CRYSTALS

Willard A. Schooley, Cicero, Ill., assignor to Motorola, Inc., Franklin Park, Ill., a corporation of Illinois
Filed Feb. 10, 1964, Ser. No. 343,603
5 Claims. (Cl. 333—30)

This invention relates to a transducer for converting electrical signals to a pressure wave in a wire or other solid medium, or for converting the pressure wave to an electrical signal, and in particular to a structure for mechanically and electrically securing a transducer to a wire such as may be used in a delay line.

In many electrical devices it is desirable to convert electrical signals into mechanical waves in a solid medium or to convert mechanical waves to an electrical signal. One such application is in a delay line for providing periods of delay longer than feasible using purely electrical circuits. One way in which this has been accomplished has been to convert the signal to a pressure wave in a wire by means of a transducer. A second transducer coupled to the wire, at a predetermined distance from the first transducer, receives the pressure wave and generates an electric signal therefrom. The distance along the wire between the first and second transducers and the speed of the pressure wave in the wire determines the duration of the time delay. Since the propagation of the pressure wave along the wire is considerably slower than the propagation of an electric signal through a conductor, long time delays may be developed in this manner.

Because of the small size of the delay line wire and the piezoelectric transducers used to receive the pressure wave and convert it to an electrical signal or to convert the electrical signal to the pressure wave, it is difficult to fasten the transducers mechanically to the delay line wire and electrically to an amplifier stage. Prior art methods have involved the separation of the delay line wire and securing the transducer between the ends thus produced. The mechanical connection thus made is weak and it is difficult to make a good electrical connection to the transducer.

Accordingly, it is an object of this invention to provide an improved structure for mechanically mounting a piezoelectric transducer to a delay line wire and electrically coupling the transducer to an amplifier stage.

A feature of this invention is the provision of a delay line structure including radially polarized piezoelectric crystal transducer in the form of a hollow cylinder through which a delay line wire passes. The crystal is electrically connected to the delay line wire by soldering and mechanically fastened to the wire with epoxy cement.

The invention is illustrated in the drawings wherein.

In practicing this invention a delay line structure is provided including a hollow cylindrical drum having a rectangular spiral groove cut on the inside. A delay line wire made from a nickel alloy such as Elenvar and having magnetostrictive properties is coiled in the groove to form a helix. An input transducer, consisting of a coil of wire wound around a hollow cylindrical jewel through which the delay line wire passes, is moved along the inside surface of the drum. As the input transducer is moved along the inside surface of the drum, the delay line wire is removed from the groove, passes through the jewel and is returned to the groove. Electrical signals coupled to the input transducer cause it to generate a magnetic field which develops a pressure wave in the delay line wire. The pressure wave travels through the delay line wire to a receiving transducer including a piezoelectric crystal which converts the pressure wave to an electrical signal corresponding to the input signal but delayed in time. The length of wire extending between the two transducers determines the amount of delay. The action of the two transducers can be reversed so that the piezoelectric crystal is the input transducer and the magnetostrictive transducer is the output transducer.

The fixed receiving transducer is a radially polarized piezoelectric crystal in the form of a hollow cylinder. Conductance coatings are provided on both the inside and the outside surfaces of the cylinder. The delay line wire passes through thet crystal and is cemented to it to secure the delay line wire to the crystal mechanically. The crystal may also be soldered to the wire to connect the crystal to the delay line wire electrically. Wires may be soldered to the outside coating of the crystal and to either the delay line wire or to the inside coating to couple the electrical signal generated by the crystal to an output amplifier. A transducer of the same construction can be used to convert electrical signals to a pressure wave in a wire coupled to the transducer.

Figures 1, 3:
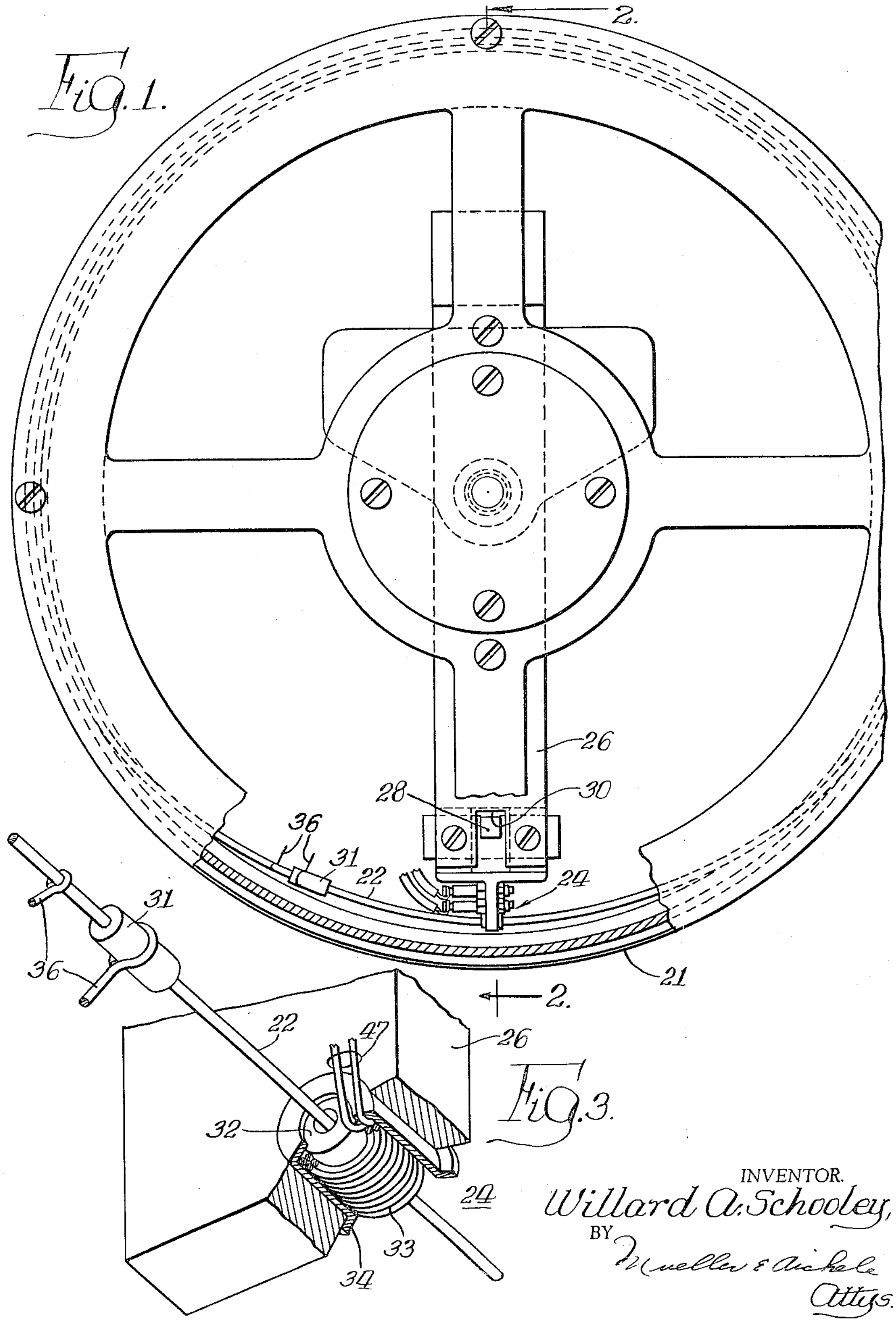
FIG. 1 is a drawing of a variable delay line structure incorporating the feature of this invention.
FIG. 3 is an enlarged view of the delay line wire and the input and output transducers.
Figures 2, 4, 5, 6:
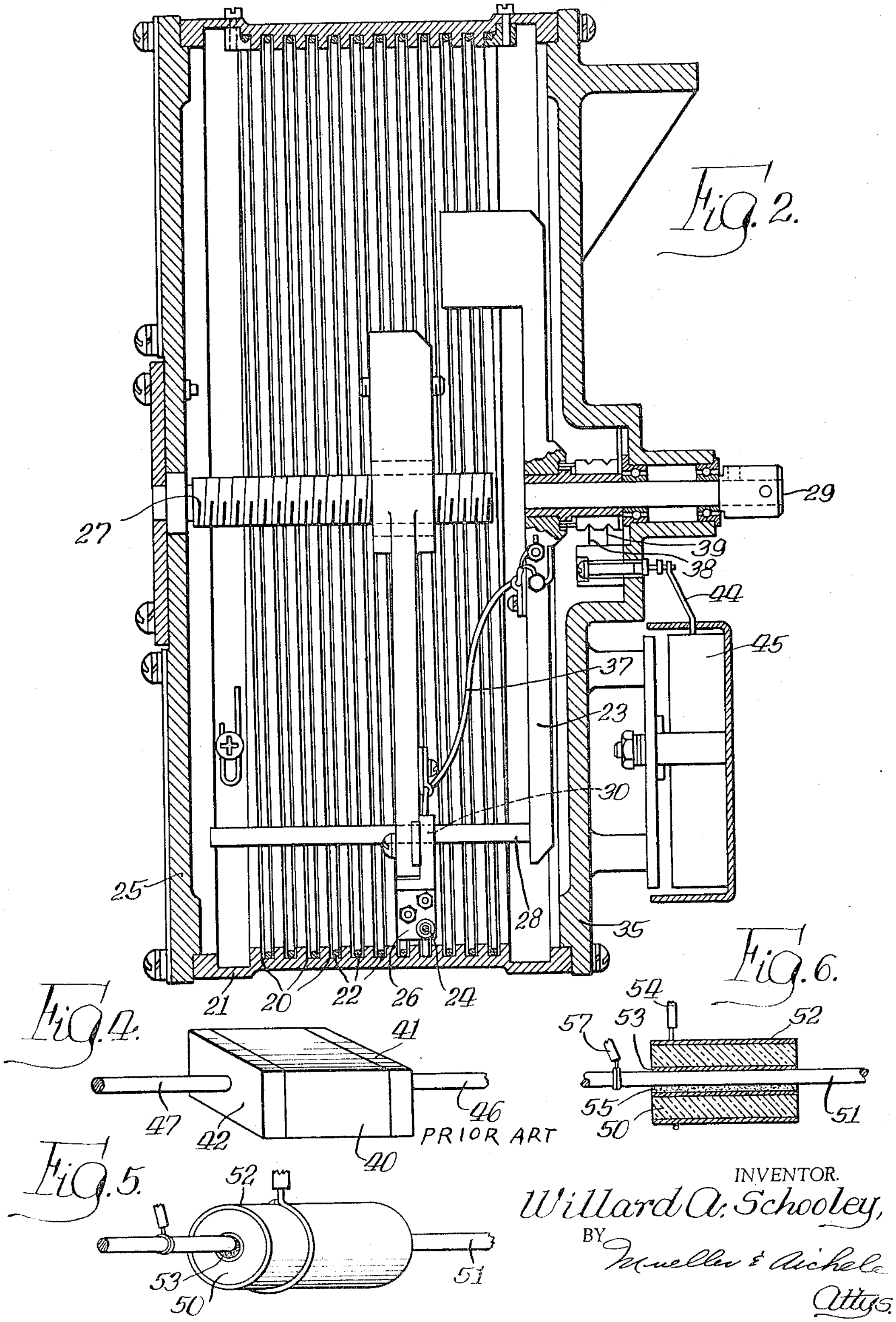
FIG. 2 is a cross sectional view of the drum shown in FIG. 1.
FIG. 4 is an enlarged view of a prior art receiving transducer showing the means by which it was mechanically connected to the delay line wire.
FIG. 5 is an enlarged view of a piezoelectric transducer incorporating the mounting feature of this invention.
FIG. 6 is a cross sectional view of the piezoelectric transducer shown in FIG. 5.

A delay line incorporating the features of this invention is shown in FIGS. 1 and 2. Similar portions of the two figures have the same identifying numerals. The delay line includes a circular drum 21 having a rectangular spiral groove 20 on the inside surface. A delay line wire 22, formed of a nickel alloy such as Elenvar and having magnetostrictive properties, rests within the groove forming a helix. An end plate 25 is secured to drum 21 and supports a threaded rod 27 centrally positioned within drum 21. One end of an arm 26 is threaded on rod 27 while the other end of arm 26 supports a transmitting transducer 24. The pitch of screw 27 is the same as that of groove 20 so that as the arm 26 is rotated, the end of arm 26 supporting transducer 24 advances along the inside surface of drum 21 with transducer 24 always opposite groove 20. Arm 26 is rotated by rod 28 which passes through opening 30 in arm 26. Rod 28 is connected to an external shaft 29 by arm 23. Shaft 29 is mounted on end plate 35 which is secured to drum 21. The rotation of shaft 29 will cause arm 26 to rotate and transducer 24 will be moved along the surface of drum 21. Transducer 24 is connected to amplifier 45 by cable 37, slip rings 38 and 39 and cable 44. A piezoelectric receiving transducer is rigidly fixed to wire 22.

An enlarged view of arm 26, transmitting transducer 24 and receiving transducer 31 is shown in FIG. 3.

Transmitting transducer 24 consists of a hollow cylindrical jewel 32 through which the delay line wire 22 passes. Jewel 32 provides a bearing surface for delay line wire 22. A coil of wire 33 is wound around bearing 32 and is coupled to a source of electrical signals by wires 47. An electrical signal applied to the coil of wire 33 generates a magnetic field which develops a pressure wave in the delay line wire 22 by means of the magnetostrictive effect. A mu-metal shield 34 is provided to minimize the external field produced by coil 33. A receiving transducer 31 is mechanically and electrically coupled to delay line wire 22. The output energy from transducer 31 is coupled to an output stage by means of wires 36.

In operation an input signal to be delayed is applied to transmitting transducer 24 from amplifier 45. The signal applied to transducer 24 creates a pressure wave in delay line wire 22 by means of the magnetostrictive effect. This pressure wave is propagated along delay line wire 22 to receiving transducer 31 where it is converted to an output signal, corresponding to the input signal, by transducer 31 which operates using the piezoelectric effect. The delay duration between the input and output signals is determined by the length of wire 22 extending between transmitting transducer 24 and receiving transducer 31.

FIG. 4 illustrates a receiving transducer used by prior delay lines of this type. The pressure wave in delay line wires 46 and 47 is a longitudinal wave and transducer 40 is also longitudinally polarized. Transducer 40 is coupled to delay line wires 46 and 47 by means of metal end plates 41 and 42 which are soldered to transducer 40. Delay line wire 46 is inserted into a hole in end plate 41 and soldered thereto. Delay line wire 47 is likewise fastened mechanically and electrically to end plate 42 by soldering thereto. As the size of the transducer 40 is small, of the order of 0.1 inch, the end plates and the delay line wires were insecurely fastened mechanically and subject to breakage.

A receiving transducer incorporating the features of this invention is shown in FIG. 5 and a cross sectional view is shown in FIG. 6. Crystal 50 is a radially polarized piezoelectric crystal in the form of a hollow cylinder. While radial polarization is not the most efficient form of polarization for the receiving transducer, it permits the use of a form of commercially available crystal which is mechanically strong and delivers sufficient output for proper operation of the delay line. Crystals having other axes of polarization may be used if desired. Delay line wire 51 passes through crystal 50, and therefore, since there is no break in delay line wire 51, it is mechanically strong. The outer surface 52 and inner surface 53 of crystal 50 are silver plated. The silver plating 53 of crystal 50 is soldered to delay line wire 51 and a connecting wire 54 is soldered to the silver plating 52 around the outside surface of crystal 50. Crystal 50 is mechanically fastened to the delay line wire by filling the space remaining between the delay line wire 51 and the inside surface of the piezoelectric crystal 50 with epoxy cement 55. This furnishes a strong mechanical bond between delay line wire 51 and crystal 50. A second connecting wire 57 is soldered to delay line wire 51 at a point near crystal 50.

In the structure shown in FIG. 3 the operation of transducers 31 and 24 can be reversed. Transducer 31 can be connected to a source of electrical signals by wires 36. An electrical signal applied to crystal 31 will deform the crystal thereby developing a pressure wave in wire 22. The pressure wave is received by transducer 24 and converted into an electrical signal by this transducer. The output energy from transducer 24 is coupled to an output stage by means of wires 47.

Thus, a simple means of connecting a transducer to a delay line wire has been shown. A hollow cylindrical piezoelectric crystal is electrically connected to a delay line wire by soldering and mechanically connected to the line wire by cement. The delay line wire is unbroken and is mechanically strong.

I claim:

1. Transducer means for a delay line wherein a delay is established by propagating a stress wave along a wire and the transducer means is coupled to the wire for receiving the stress wave and converting the same to an electrical signal, said transducer means including in combination, a radially polarized piezoelectric crystal having an opening therethrough with the wire passing through said opening, and means within said opening mechanically coupling said crystal to the wire, said crystal being responsive to the stress wave in the wire to be deformed thereby, and said crystal developing an electrical signal in response to said deformation.

2. In a delay line wherein a delay is established by propagating a stress wave along a delay line wire and having transducer means coupled to the wire for receiving the stress wave and converting the same to an electrical signal, the combination including, a hollow cylindrically shaped radially polarized piezoelectric crystal having inside and outside surfaces, a delay line wire having an outside diameter less than the diameter of said inside surface of said crystal, said delay line wire passing through said crystal and being mechanically coupled to said inside surface, said crystal being responsive to the stress wave in said wire to be longitudinally deformed thereby, said crystal developing an electrical signal in response to said deformation, and output conductors coupled to said crystal for receiving the electrical signal.

3. In a delay line wherein a delay is established by propagating a stress wave along a delay line wire and having transducer means coupled to the wire for receiving the stress wave and converting the same to an electrical signal, the combination including, a hollow cylindrically shaped radially polarized piezoelectric crystal having silver plated inside and outside surfaces, said inside surface having first and second portions, a delay line wire having an outside diameter less than the diameter of said inside surface, said delay line wire passing through said crystal, said first portion of said inside surface being electrically connected to said delay line wire, said second portion of said inside surface being mechanically connected to said delay line wire, and a first output conductor coupled to said outside surface and a second output conductor coupled to said delay line.

4. In a delay line wherein a delay is established by propagating a stress wave along a wire and having a first transducer means for converting an electrical signal to the stress wave and a second transducer means for converting the stress wave to an electrical signal, at least one of said transducer means including in combination, a hollow cylindrically shaped radially polarized piezoelectric crystal having inside and outside surfaces, the outside diameter of the delay line wire being less than the diameter of said inside surface of said crystal, the delay line wire passing through said crystal, means mechanically and electrically coupling said inside surface of said crystal to the wire, a first conductor coupled to said outside surface, and a second conductor coupled to said delay line wire whereby electrical connections are made to said crystal.

5. A transducer unit for converting between electrical signals in conductors and stress waves in a solid medium, said transducer unit including in combination, a hollow cylindrically shaped radially polarized piezoelectric crystal having silver plated inside and outside surfaces, said inside surface having first and second portions, the dimensions of said inside surface being greater than the outside dimensions of the solid medium whereby the solid medium passes through said hollow crystal, solder means connecting said first portion of said inside surface to the solid medium, cement means connecting said second portion of said inside surface to the solid medium, a first electrical conductor coupled to said outside surface, and a second electrical conductor coupled to said inside surface whereby electrical connections are made to said crystal.

References Cited by the Examiner

UNITED STATES PATENTS

| | | | |
|---|---|---|---|
| 2,101,272 | 12/1937 | Scott | 333—72 |
| 2,616,223 | 11/1952 | Jonker | 51—59 |
| 2,669,666 | 2/1954 | Mason et al. | 310—9.6 |
| 2,838,695 | 6/1958 | Thurston | 333—72 |
| 2,838,696 | 6/1958 | Thurston | 310—8.5 |
| 2,877,432 | 3/1959 | Mattiat | 333—72 |
| 3,011,136 | 11/1961 | Scarrott | 333—30 |

HERMAN KARL SAALBACH, *Primary Examiner.*

A. R. MORGANSTERN, M. NUSSBAUM, *Assistant Examiners.*